United States Patent [19]

Humphries

[11] 4,359,281
[45] Nov. 16, 1982

[54] METHOD AND APPARATUS FOR TESTING THE BRAKING EFFICIENCY OF MACHINES

[75] Inventor: John M. Humphries, Hornchurch, England

[73] Assignee: The Marconi Company Limited, Chelmsford, England

[21] Appl. No.: 142,830

[22] Filed: Apr. 22, 1980

[30] Foreign Application Priority Data

Apr. 11, 1979 [GB] United Kingdom ............... 7912731

[51] Int. Cl.³ .................... G01L 5/28; G01B 11/14
[52] U.S. Cl. ................................ 356/373; 73/862; 250/237 G
[58] Field of Search ............ 356/373, 27, 374, 375, 356/399; 73/133 R; 33/1 L, 125 A, 125 C, 862, 862.06; 250/237 G, 231 SE

[56] References Cited

U.S. PATENT DOCUMENTS

| | | | |
|---|---|---|---|
| 3,153,111 | 10/1964 | Barber et al. | 356/374 |
| 3,798,958 | 3/1974 | Marini et al. | 356/70 |
| 4,097,875 | 6/1978 | Scholten et al. | 250/231 SE |
| 4,112,295 | 9/1978 | Dubik et al. | 250/237 G |

FOREIGN PATENT DOCUMENTS

| | | |
|---|---|---|
| 661201 | 11/1951 | United Kingdom . |
| 1055692 | 1/1967 | United Kingdom . |
| 1118879 | 7/1968 | United Kingdom . |
| 1228277 | 4/1971 | United Kingdom . |
| 1314002 | 4/1973 | United Kingdom . |
| 1387745 | 3/1975 | United Kingdom . |
| 1457394 | 1/1976 | United Kingdom . |
| 1431788 | 4/1976 | United Kingdom . |
| 1448854 | 9/1976 | United Kingdom . |

Primary Examiner—R. A. Rosenberger
Attorney, Agent, or Firm—Spencer & Kaye

[57] ABSTRACT

In a known method of testing braking effectiveness, a sheet carrying a series of lines is attached to a moving part of a machine and these lines are sensed sequentially by a photo detector as the machine part moves. The output of the photo detector thus gives an indication of the movement of the machine part during the braking operation.

In the invention the photo detector 21,22 is associated with an optical system 20 which is used to project light to the series of lines; and to focus light reflected from the lines, onto the photo detector. In this way the photo detector and associated equipment can easily be set up, e.g. on a tripod, at a position spaced from the machine whilst still enabling a reliable signal to be generated in the photo detector.

An important preferred feature of the invention is the use of retroreflective material on the aforementioned sheet. This greatly enhances the strength of the signal generated by the photo detector.

6 Claims, 6 Drawing Figures

METHOD AND APPARATUS FOR TESTING THE BRAKING EFFICIENCY OF MACHINES

BACKGROUND OF THE INVENTION

This invention relates to a technique for measuring the time taken for a machine part, e.g. the blade of a guillotine or a press, to come to a halt, or an approximate halt, after a stopping process has been initiated.

A technique is known in which a sheet bearing a series of lines is fixed to the machine part and viewed by an optical system. The optical system includes a photodetector and movement of the series of lines across the field of view of the system causes the photodetector to produce an output having a characteristic dependent on the velocity of movement. This enables identification of an instant when the machine part comes to a halt or almost to a halt, thus enabling a measure of the braking effectiveness to be made.

A problem associated with the aforementioned technique is to align the optical system with the sheet bearing the series of lines, and to cope with varying ambient light conditions.

BRIEF SUMMARY OF THE INVENTION

An object of the invention is to deal with the aforementioned problems and it provides apparatus and a method for testing the effectiveness of braking of a machine comprising an optical system for focussing an image of a source of illumination onto a surface of a member associated with a moving part of the machine, the same optical system being arranged to focus an image of the thus illuminated part of the surface onto a photodetector, the apparatus further including means for receiving signals from the photodetector and for producing therefrom an indication of the instant when the said surface reaches a given velocity or becomes stationary.

The said surface associated with the moving part of the machine preferably carries a pattern of relatively reflective and relatively non-reflective parts. The relatively reflective parts are preferably retroreflective and can be formed by a composition consisting of a multitude of minute transparent particles deposited on a substrate.

The apparatus preferably includes a mirror which is partly reflective and partly transmissive, the mirror thus providing two optical paths, one for light travelling to the optical system from the source and one for light travelling from the optical system to the photodetector.

The optical system is preferably designed to focus onto the said surface an image of a particular shape. The said surface is then provided with markings which correspond to the said shape. This enables the operator to match the shape marked on the surface to the shape projected on the surface so as to ensure that the system is properly aligned.

The shape of the image is preferably substantially rectangular and it is convenient to align this with a pair of parallel lines marked on the moving surface. If the edges of the rectangle are castellated this makes it particularly easy to affect the alignment.

DETAILED DESCRIPTION

Figure 1:
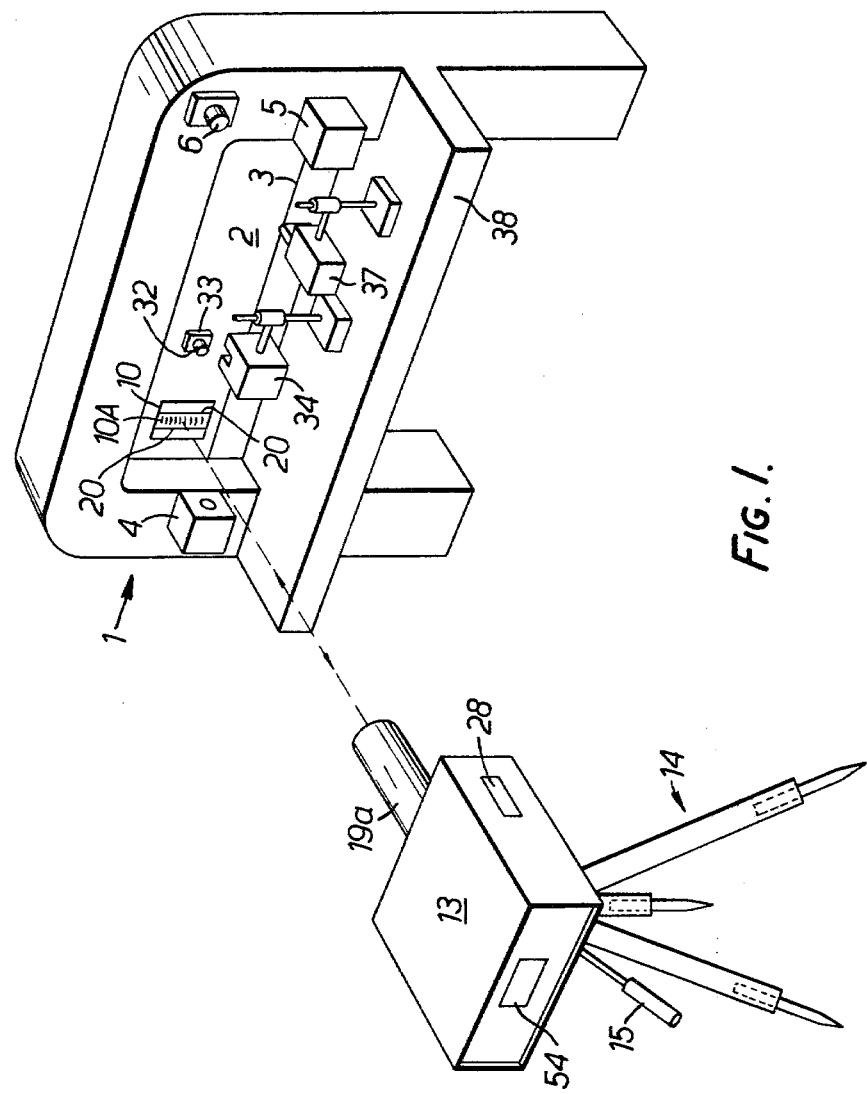
FIG. 1 shows a guillotine whose braking efficiency is under test.

Referring firstly to FIG. 1, there is shown a guillotine 1 having a moving blade 2 with a leading edge 3. It will be understood that the invention is not only applicable to guillotines. It is also applicable to pressing tools and any other machines where there are dangerous moving parts.

In front of the blade 2 of the guillotine is a beam of light or other radiation (e.g. infra-red) projected by a projector 4 to a photo-sensitive receiver 5. When the light beam is interrupted during movement of the blade 2 a stop signal is generated by the receiver 5 which applies the brakes of the machine. The brakes can also be applied by pressing a stop button 6. This generates a similar stop signal.

In alternative machines, stop signals may be generated by other means; for example by the release of a so called dead man's handle or by the application of pressure to a pressure sensitive mat on the floor. Another possibility is to provide two plates in place of the units 4 and 5 and to detect changes in the capacitance between these plates, such changes in the capacitance indicating that the operator's hand may be dangerously positioned close to the moving part.

Figure 2:
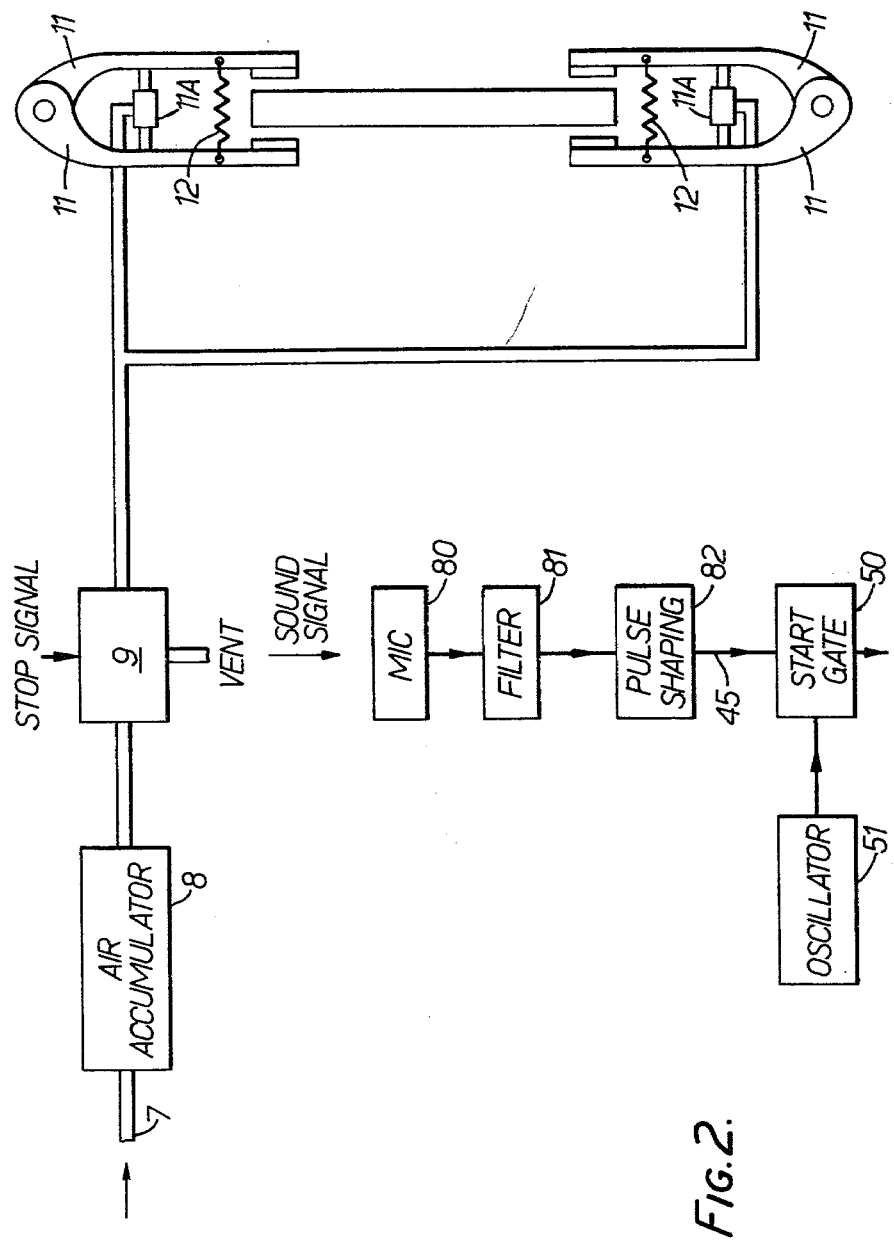
FIG. 2 illustrates the braking mechanism of the machine illustrated in FIG. 1.

The way in which the brakes are applied is illustrated very schematically in FIG. 2. Air is supplied along a line 7 to an accumulator 8 and thence through a venting valve 9 to pneumatic cylinders 11A. The latter act on brake caliper arms 11 to hold the arms open against the action of brake application springs 12. On receipt of a stop signal, e.g. from button 6 or receiver 5, the valve 9 vents the air in the accumulator 8 to the atmosphere resulting in the application of the brakes. An object of the apparatus to be described is to measure the efficiency of the braking system and of the systems (e.g. 4 and 5) which lead to the actuation of the braking system.

In order to measure the braking efficiency it is necessary to produce two timing signals; the first of which initiates operation of the braking sequence; and the second of which defines the time when the member 2 comes to a halt or reaches a velocity sufficiently low to preclude risk of accidents.

Reverting now to FIG. 1, there is attached to the blade 2 of the machine a sheet 10 of retroreflective material carrying a series of curved bars 10A. The bars are of retroreflective material on a relatively non-reflective, e.g. matt black, background. Alternatively, the bars could be matt black on a retroreflective background.

The sheet 10 is viewed by an optical device 13 which projects a beam of light onto the sheet 10 and receives light reflected from the sheet 10. The device 13 is mounted on a tripod 14 which is adjustable in height above the factory floor; and has a handle 15 which enables the device 13 to be set at any desired angle. This enables a zoom lens system to be aligned with the sheet 10.

Figure 3:
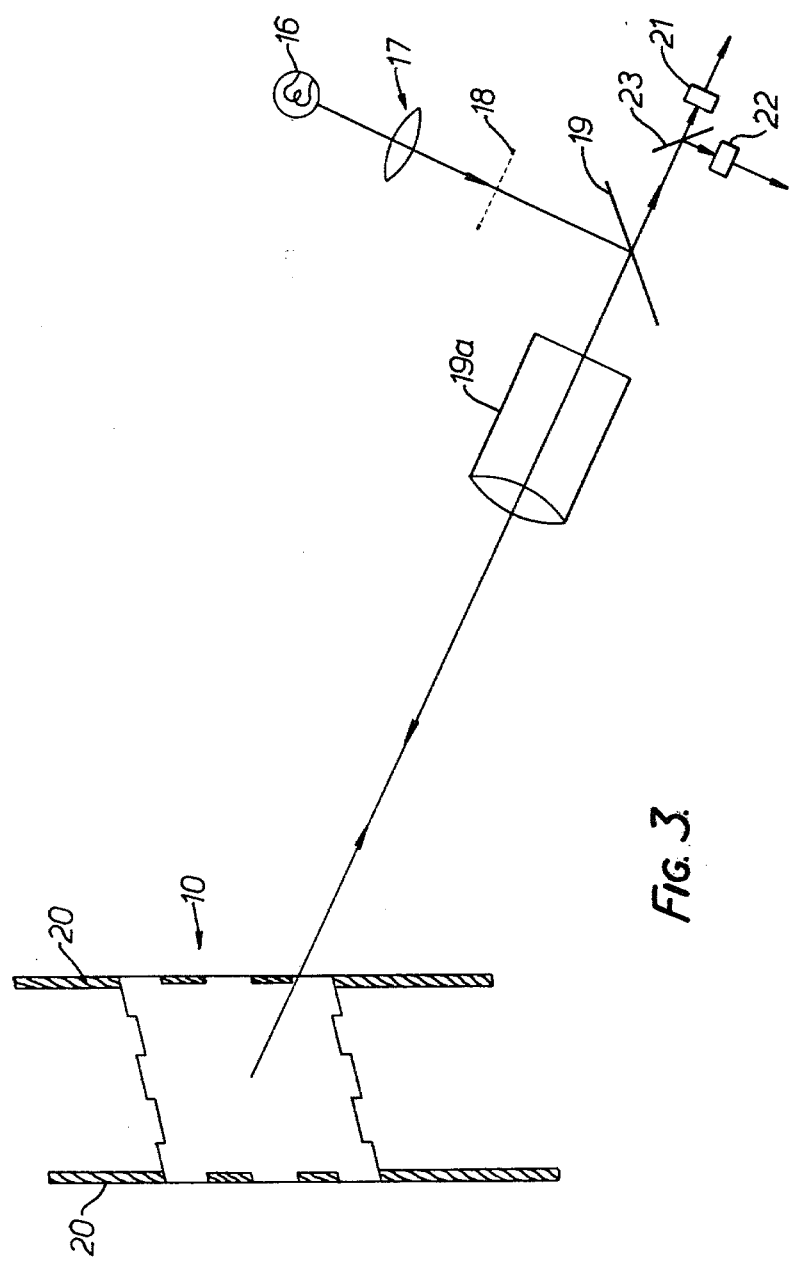
FIG. 3 illustrates the optical system incorporated in the optical apparatus indicated at 13 in FIG. 1.

The device 13 is shown in more detail in FIG. 3. The light emitter 16 generates light which passes through a lens system 17 and then through an aperture stop 18 which can be considered to constitute a source of parallel radiation. The latter has a rectangular aperture with castellated edges for a purpose which will become apparent later. After passing through the stop 18 the light is reflected by a partially reflective and partially transmissive mirror 19 and passes through a zoom lens system 19A which focusses an image of the source (i.e. of the aperture stop 18) on the sheet 10. The sheet 10 has two vertical lines 20 on it and, after adjusting the focus by means of the zoom lens 19A, the attitude of the device 13 is adjusted, using the handle 15, so that the castellations are aligned with the lines 20. The apparatus is then correctly set for observing movement of the bars of the sheet 10 and thus the movement of the blade 2.

Light reflected from the bars on the sheet 10 is focussed by the zoom lens 19A, onto photo-sensors 21 and 22 after being split by a partially reflective, partially transmissive mirror 23. The photo-sensors give identical electric signals which vary cyclically in amplitude as the blade 2 moves and as the images of the bars 10A (not shown in FIG. 3) traverse the photosensors 21 and 22.

Figure 4:
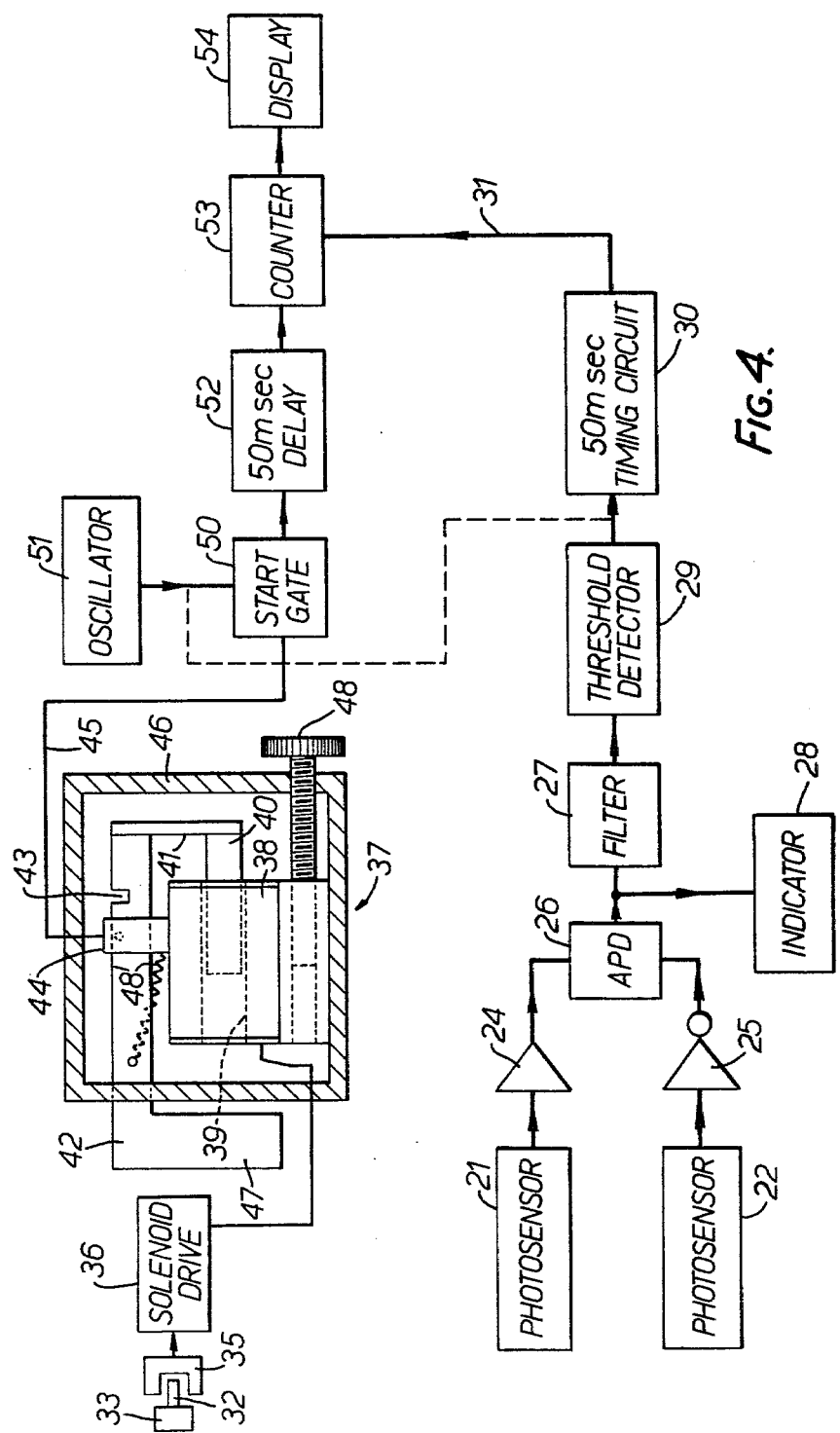
FIG. 4 is a block diagram of the electrical circuitry employed in the system illustrated in FIG. 1 and also shows the mechanical arrangement of a device for interrupting a protective light curtain in front of the moving blade of the machine.

Referring now to FIG. 4, the two photo-sensors 21 and 22 are used to produce a signal which indicates when the blade 2 has almost halted. The outputs of sensors 21 and 22 are amplified at 24 and 25 respectively, the amplifier 26 being an inverting amplifier. The outputs of circuits 24 and 25 are then added at 26 to give a signal which is similar to that at the output of 21 but less subject to variations caused by differences in the reflectivity of different parts of the sheet 10. The output of the adding circuit 26 is passed to a high pass filter 27 designed to remove frequencies of less than about ten hertz. The purpose of this is to remove signals derived from very low velocities of the blade 2, e.g. due to vibrations as it comes to a halt.

The output of the adder 26 is also passed to an indicator 28 which may for example be a moving coil voltmeter. It serves to indicate to the operator that a signal is being received and helps him to ensure that the apparatus 13 is correctly aligned.

The output of the filter 27 is fed to a threshold detector 29 which produces an output pulse every time its input traverses positive and negative threshold values of about 200 millivolts.

The pulses from the detector 29 are received by a timing circuit 30 and this produces a logic signal on line 31 which indicates whether or not a pulse from circuit 29 has been received during the preceding 50 milliseconds. This logic signal thus provides an effective indication of when the speed of the member 2 has been reduced to a value very close to zero.

The system for producing a signal which initiates the actuation of the braking sequence will now be described. The initiation of the sequence is, for testing purposes, preferably at a time when the blade 2 or the equivalent moving member reaches its maximum velocity. This typically occurs during mid-stroke but differs from machine to machine.

In the system shown in FIGS. 1 and 4 the brake actuation signal is derived by placing a special lug 32 on the blade 2 where it is held in position by a permanent magnet 33 to which the lug as attached.

The lug 32 operates with a signal generating device 34 (FIG. 1) which includes an opto-switch 35 (FIG. 4) and a solenoid driving circuit 36 (also FIG. 4). The solenoid driving circuit 36 produces a 150 millisecond pulse commencing at the time when the lug 32 interrupts the beam of light or other radiation produced in the opto-switch 35. It should be explained here that an opto-switch is a miniature device which has in one encapsulated unit, a source of light or other radiation such as infra-red. This radiation is passed across a gap to a receiver. Entry of a projection into the gap breaks the beam and the receiver consequently gives out a signal which can be used for any desired purpose.

The 150 millisecond pulse from the solenoid drive circuit 36 is passed to a curtain interrupting device 37 which is also shown in FIG. 1. Like the device 34 it is mounted adjustably on a stand which is held magnetically to the bed 38 of the machine. The curtain interrupting device 37 will now be described in detail with reference to FIG. 4.

A solenoid 38 has a bore 39 containing an iron slug 40 which is drawn into the solenoid when the latter is actuated by the pulse from the solenoid drive circuit 36. The slug 40 is connected to a bracket 41 which in turn is connected to the horizontal arm of an L shaped sheet 42. The horizontal arm has on its upper surface a notch 43 and extends through the gap of an opto-switch 44. The light beam of the opto-switch 44 is arranged so that, when the solenoid is not actuated, it, i.e. the light beam, passes through the notch 43. However, as soon as actuation of the solenoid occurs, the light beam of the switch 44 is interrupted and a signal is passed along the line 45. The opto-switch 44 is mounted adjustably on a bracket fixed to the solenoid. By suitably adjusting the mounting of the opto-switch on this bracket it is possible to ensure that the signal appears on the line 45 at virtually the same instant as the solenoid is actuated. The solenoid is mounted in a casing 46 from which the vertical part 47 of the arm 42 projects.

This part 47 constitutes a flag which is used to interrupt the light beam projected between the devices 4 and 5 shown on FIG. 1. In order to set up the apparatus the curtain interrupter 37 is placed approximately in the correct position on the machine bed 38 and the knurled knob 48 is then turned. This adjusts the position of the solenoid relative to the housing 46. The flag 47 is held by a spring 48 and an abutment (not shown) relative to the housing 46 and so the adjustment of the solenoid also means that the position of the flag 47 is adjusted. This adjustment is continued until the flag 47 is in a position where it just does not interrupt the light beam between devices 4 and 5 sufficiently to cause stopping of the machine.

From the above it will be appreciated that the moment that a signal is generated by the solenoid drive circuit 36, the flag 47 interrupts the light beam between devices 4 and 5 thereby initiating the stopping sequence of the machine. At the same instant the opto-switch 44 generates a signal which is fed along line 45 to a gate 50. This opens the gate thereby allowing pulses, occurring at 1 kilohertz, to be fed from an oscillator 51, through a 50 millisecond delay circuit 52 (to compensate for the delay introduced by circuit 30) to a counter 53. The counter thus starts accumulating a count which is terminated when the signal appears on the line 31 indicating that the blade 2 has come to a halt. The count accumulated at 53 thus indicates the time taken for the blade 2 to stop. This count is displayed on a digital display device 54 which is also shown on FIG. 1.

If it is desired to measure the distance through which the blade 2 travels before coming to a halt (instead of the time it takes to come to a halt) it would be possible to replace the oscillator 51 with a connection as shown in broken lines. This will mean that the counter 53 counts the number of signals produced by the photo-sensors 21 and 22 and this, of course, represents the distance, as measured by the bars 10A through which the blade 2 has moved. Another possible modification would be to produce the stop signal, which is fed to the counter 53, by a system in which the sheet 10 is marked with a series of triangular or similar shapes. The images of these are projected onto a further photo-sensor through two slits and the output from this further photo-sensor characterises the direction of movement of the blade 2 and the instant when it comes to a halt. A suitable halt signal can thus be derived for application to the counter 53.

In the system described so far, the initiation of the braking sequence has been carried out by interrupting the light beam between the devices 4 and 5. It may, however, on some occasions be desired to test the braking efficiency of the machine when braking is effected by some other means, for example by pressing the button 6. When it is desired to do this the apparatus shown in FIG. 5 or FIG. 6 can be used.

Figure 5:
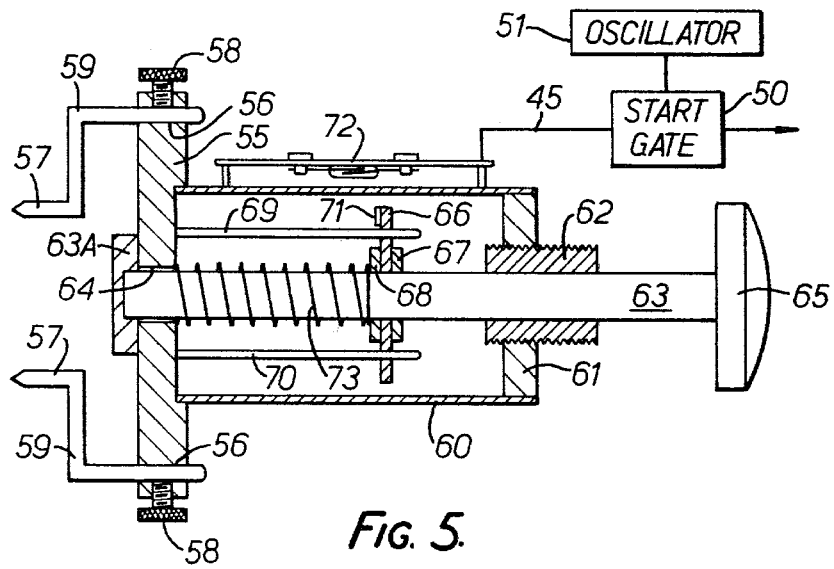
FIG. 5 is a cross-section through a mechanism for initiating operation of the brakes by pressing an emergency stop button on the machine of FIG. 1.

Referring firstly to FIG. 5, the apparatus comprises a plate 55 having, spaced around its periphery, three bores 56 of which only two are shown in the drawing. These bores 56 receive legs 57 which can be locked in the bores 56 by locking screws connected to knurled knobs 58. The legs 57 cannot only slide within the bores 56 but can also rotate so that the operator can adjust the spacing between the ends of the legs 57. This is because of the bends 59 in the latter.

The plate 55 is connected to a cylindrical housing 60 having an end panel 61 into which it set a threaded bush 62. The bush 62 supports a shaft 63 which also passes through an aperture 64 in the plate 55. Fixed to one end of the shaft 63 is a pad 63A and fixed to the other end is a push member 65. The shaft 63 also carries a disc 66 which is fixed at a given position along the shaft 63 by two spring washers 67 and 68. The disc 66 is guided by two rods 69 and 70 which pass through holes in the disc 66. The purpose of the disc 66 is to carry a permanent magnet 71 which co-operates with a reed switch 72 mounted on the outside of the casing 60. The components 63, 64, 65, 66, 67 and 71 are held in the positions illustrated by a spring 73. In this position the magnet 71 is just not sufficiently close to the switch 72 to close the contacts of the latter.

To use the device shown in FIG. 5 the legs 57 are adjusted by means of the knobs 58 so that when the ends of the legs 57 are pressed against the surrounds of the emergency stop button 6 (FIG. 1) the pad 63A engages the button 6 but does not quite depress it sufficiently to actuate the brakes. In order to commence the braking sequence the push member 65 is struck manually and this instantaneously depresses the stop button 6 and closes the contacts of the switch 72. The resulting signal from the switch 72 is passed along line 45 to the gate 50 in exactly the same way as was the signal from the curtain interrupter 37 as described with reference to FIG. 4.

A feature of the device shown in FIG. 5 is that it is readily adaptable for co-operation with virtually any type or size of stop button in current use.

Figure 6:
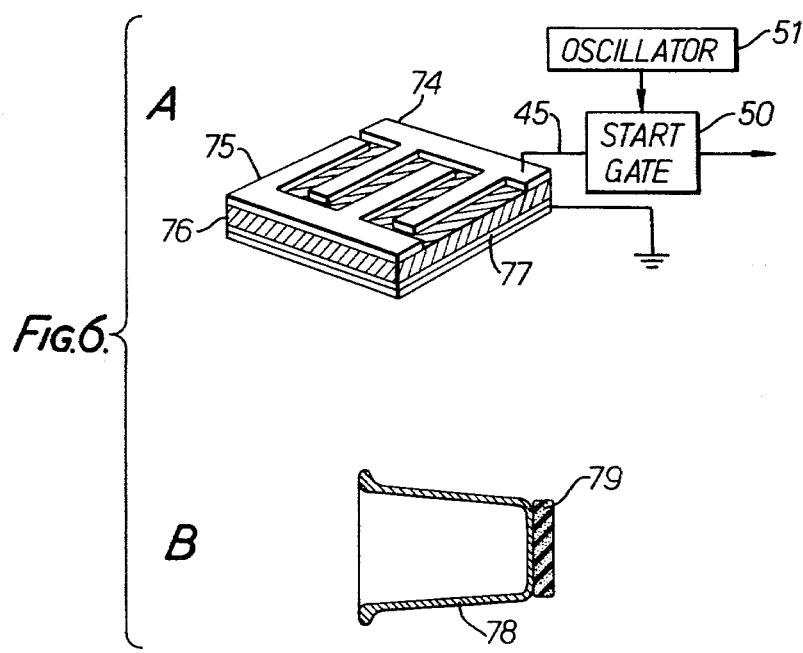
FIG. 6 illustrates a touch-switch also for cooperation with the emergency stop button of FIG. 1.

The apparatus shown in FIG. 5 is designed to commence the timing sequence at the instant that the contacts of the emergency stop button 6 are closed. The possible time period between the instant when the operator first touches the button 6 and the instant when the contacts close is not taken into consideration. The apparatus shown in FIG. 6 is for use in circumstances where it is desired to take this into consideration. Referring to part A of FIG. 6, the illustrated device is a touch switch. It has two contacts 74 and 75 which take the form of interdigitated electrodes as illustrated. These electrodes are formed by a thin layer of metal on an insulating sheet 76. They can be formed by etching or by vapour deposition or by any other suitable method. The electrode 75 is connected to a conductive sheet 77 on the reverse side of the insulator 76. This sheet or layer is grounded and has been found to improve the reliability of the touch switch in that it is, because of the conductor 77, less subject to false actuations. When an operator touches the surface constituted by electrodes 74 and 75, the potential of the electrode 74 is immediately reduced to ground potential, or a potential close to ground. This reduction in potential is used as a signal which, like the signal derived from the switch 72, FIG. 5, and like the signal derived from the switch 44 of FIG. 4, is passed along the line 45 to the start gate 50.

In order to give even further improved reliability the device used in FIG. 6B is used. This device includes a metal cup 78 which fits like a thimble over the index finger of the operator. The closed end of the cup 78 is attached to a pad 79 of foam conductive rubber. This is a composition containing rubber and conductive particles, usually of carbon. By using the device shown in FIG. 6B, when the operator touches the touch switch of FIG. 6 with the pad 79 a more reliable signal is generated on the line 45.

It will be appreciated that the start signal applied to the gate 50, in the case of the apparatus shown in FIG. 6, will be at the instant that the operator first makes contact with the emergency button 6. This is at an earlier time than the time of the corresponding signal generated by the apparatus as shown in FIG. 5.

Another possible measurement which one may wish to make when testing the braking of industrial machines is the time taken for the machine to stop after the brakes are actually applied. Alternatively it may be wished to measure the distance moved during this time. In the case of pneumatically operated brakes such as have been described with reference to FIG. 2, this measurement can be made by using a microphone as shown at 80 on FIG. 2. When the brakes are applied by venting the air to atmosphere through the vent valve 9 a very loud noise is generated. This noise contains a very wide spectrum of frequencies and is detected by microphone 80. The resulting signal is filtered by a circuit 81 which is designed to remove frequencies associated with noises commonly occurring in industrial premises.

The output of the circuit 81 can thus be assumed to be derived from the venting of the pneumatic system of the machine. This output is fed to a pulse shaping circuit 82 to produce a signal on line 45 which signal is passed to the start gate 50 as has been described before.

I claim:

1. A method of testing the braking effectiveness of a machine having a first part and a second part which moves relative to said first part, said second part including a member affixed thereto having a surface carrying a pattern of spaced reflective bars and edge markings, comprising the steps of:

focusing a rectangular image with castellated edges onto the surface of said memeber by means of an optical system;

adjusting said optical system to align said castellated edges of said rectangular image with said edge markings of said pattern;

focusing reflected light from said pattern onto a photodetector by means of said optical system; and utilizing a signal at the output of said photodetector to determine the amount of time it takes after braking has been applied to said second part for said second part to come to a halt or to reach a predetermined velocity relative to said first part.

2. A method according to claim 1 wherein said edge markings include a pair of parallel lines.

3. A method according to claim 1 further comprising the steps of:

producing a first timing signal that initiates braking of said second part and the accumulation of a count;

wherein said utilizing step comprises processing the output of said photodetector to produce a second timing signal indicative of when said second part of said machine has come to a halt or reached a predetermined velocity; and using said second timing signal to stop the accumulation of said count, the accumulated count being indicative of the braking effectiveness of the machine.

4. Apparatus for testing the braking effectiveness of a machine having a fixed part and a moving part, said moving part having a surface pattern thereon with spaced reflective bars and edge markings of predetermined shape, said apparatus comprising:

a radiation source including an aperture having castellated edges and a shape corresponding to that of said surface pattern;

optical means for focussing said radiation source on the surface pattern of said moving part with the castellated edges of said aperture in registration with the edge markings of said surface pattern to ensure proper alignment of said apparatus; and a pair of photodetectors for receiving radiation reflected from said surface pattern, the outputs of said photodetectors producing signals which indicate when the moving part of said machine has stopped or reached a predetermined velocity relative to said fixed part.

5. Apparatus according to claim 4 wherein said optical means comprises an optical system and a mirror having a partially reflective and partially transmissive surface interposed between said radiation source, optical system and photodetectors, said mirror transmitting radiation from said radiation source through said optical system to the surface pattern on the moving part of said machine, said radiation being reflected from said surface pattern through said optical system and said mirror to said photodetectors.

6. Apparatus according to claim 4 or 5 wherein said surface pattern and said aperture are substantially rectangular.

* * * * *